(12) United States Patent
Liu

(10) Patent No.: US 11,255,421 B2
(45) Date of Patent: Feb. 22, 2022

(54) ELECTRIC CONTROL BOX FOR CONTROL OF LINEAR MOVEMENT

(71) Applicant: Jen-Chih Liu, Kaohsiung (TW)

(72) Inventor: Jen-Chih Liu, Kaohsiung (TW)

(73) Assignee: NEW KAILUNG GEAR CO., LTD., Kaohsiung (TW)

( * ) Notice: Subject to any disclaimer, the term of this patent is extended or adjusted under 35 U.S.C. 154(b) by 38 days.

(21) Appl. No.: 16/885,234

(22) Filed: May 27, 2020

(65) Prior Publication Data

US 2021/0370500 A1 Dec. 2, 2021

(51) Int. Cl.
| | |
|---|---|
| *F16H 57/039* | (2012.01) |
| *F16H 1/20* | (2006.01) |
| *F16H 19/04* | (2006.01) |
| *F16H 57/031* | (2012.01) |
| *H02K 7/116* | (2006.01) |
| *F16H 57/02* | (2012.01) |

(52) U.S. Cl.
CPC ............ *F16H 57/039* (2013.01); *F16H 1/203* (2013.01); *F16H 19/04* (2013.01); *F16H 57/031* (2013.01); *H02K 7/1166* (2013.01); *F16H 2057/02034* (2013.01); *F16H 2057/02086* (2013.01)

(58) Field of Classification Search
CPC ........ F16H 1/203; F16H 19/04; F16H 57/031; F16H 57/039; F16H 2057/02034; F16H 2057/02086; H02K 1/1166
See application file for complete search history.

(56) References Cited

U.S. PATENT DOCUMENTS

| | | | | | |
|---|---|---|---|---|---|
| 3,992,956 | A | * | 11/1976 | Fischer | A63H 17/262 74/29 |
| 5,353,902 | A | * | 10/1994 | Flowtow | F16D 23/12 192/84.6 |
| 7,610,981 | B2 | * | 11/2009 | Banno | B60K 23/08 180/233 |
| 8,316,981 | B2 | * | 11/2012 | Nyberg | F16H 61/22 180/249 |
| 10,415,681 | B2 | * | 9/2019 | Molde | F16H 48/24 |
| 2008/0011113 | A1 | * | 1/2008 | Safran | H02K 7/06 74/89.17 |
| 2010/0162838 | A1 | * | 7/2010 | Hirai | F16H 25/2454 74/89.33 |
| 2016/0375762 | A1 | * | 12/2016 | Lee | B60K 15/05 296/97.22 |
| 2017/0144714 | A1 | * | 5/2017 | Dupay | F16H 1/222 |

* cited by examiner

*Primary Examiner* — Joseph Brown

(57) ABSTRACT

An electric control box for control of linear movement includes a base seat having a concave recess at an upper side thereof; a push rod gear being installed at a left wall of the recess of the base seat; the push rod gear being extended with a push rod teeth; a motor being installed within an upper cover; the motor can driven the push rod gear; a movable table driven by the push rod and capable of moving linearly; a push rod being installed at a front end of the moving table and extending out of the moving table; and two sliding tracks being installed with respective teeth strips; two sides of the movable table being installed with respective moving gears for engaging with the teeth strips so that the moving table is movable thereon; and thereby, the moving table is movable along the two sliding tracks.

6 Claims, 4 Drawing Sheets

ELECTRIC CONTROL BOX FOR CONTROL OF LINEAR MOVEMENT

FIELD OF THE INVENTION

The present invention is related to electric control boxes, and in particular to an electric control box for control of linear movement.

BACKGROUND OF THE INVENTION

Generally, a linear electric control box serves to cause an element to move linearly so as to control other relative components. This technology is used in many prior arts. However, in these prior arts such as those disclosed in U.S. Pat. No. 5,353,902, US2010/0162838 A1, U.S. Pat. No. 7,610,981 B2, U.S. Pat. No. 8,316,981 B2 and U.S. Ser. No. 10/415,681 B2, etc, there are many different designs for achieving the control of liner moving of the elements.

However, these prior arts (U.S. Pat. No. 5,353,902, US2010/0162838 A1, U.S. Ser. No. 07/610,981 B2, U.S. Pat. No. 8,316,981 B2 and U.S. Ser. No. 10/415,681 B2, etc) have may defects necessary to be improved, such as large volumes, waste of spaces, too many elements, low preciseness, unsteady, large friction, short lifetime, and other defects. In one prior art U.S. Ser. No. 10/415,681B2, although this patent provides the advantages of small volume so that the waste of space is low, while the driven nut 610 for driving movement is directly installed on an external thread 608a on a rotating lead screw 608. Furthermore the driven nut 601 is limited by the switches 806 and 808 so that the position and direction of movement are defined. Thereby, when the lead screw 608 rotates, the driven nut 610 linearly moves along a channel between the two switches 806, 808. However, the friction force therebetween is too large. The driven nut 610 is unbalance and not so precise and too large friction force causes that the gap of the channel between the driven nut 610 and the switches 806, and 808 become large gradually. The movement, the element is easy to vibrate. As a result, the wearing of the elements become serious, and the preciseness of the elements reduces and the lifetime is decreased.

Thereby, the object of the present invention is to provide a linear moving electric control box structure which has a small volume, occupies a small space, has precise linear movement and is steady with a long lifetime, low ratio of destroy.

SUMMARY OF THE INVENTION

Accordingly, the object of the present invention is to provide an electric control box for control of linear movement, wherein advantages of the present invention are that: the volume is small and the ratio of destroy is low. The space is used effectively so that the moving path for pushing and pull is long and thus a large pushing force or pulling force may be generated easily. Furthermore, the moving table can move and position in multiple points due to the engagements of the worm rod with the teeth strips. The moving of the moving table is steady and precise. Moreover, the present invention is a product which can be used industrially and economically.

To achieve above object, the present invention provides an electric control box for control of linear movement, comprising: base seat having a concave recess at an upper side thereof; an upper cover having a hollow cavity at a lower side thereof; the upper cover being installed at an upper side of the base seat; as the upper cover covers on the upper side of the base seat, they are formed as a box body; a push rod gear being installed at a left wall of the recess of the base seat; the push rod gear being extended with a push rod teeth; a motor being installed within the upper cover; the motor being installed with a motor gear for engaging with the push rod gear so that the motor can driven the push rod gear; the motor being installed with a motor fixing sheet for assembling the motor within the upper cover; a circuit assembly being installed on an inner bottom of the recess of the base seat for controlling the motor; a movable table driven by the push rod and capable of moving linearly; a push rod being installed at a front end of the moving table and extending out of the moving table; and two sliding tracks being installed in two lateral walls of base seat; each of the sliding track being installed with a teeth strip; two sides of the movable table being installed with respective moving gears for engaging with the teeth strips so that the moving table is movable thereon; and thereby, the moving table is movable along the two sliding tracks.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
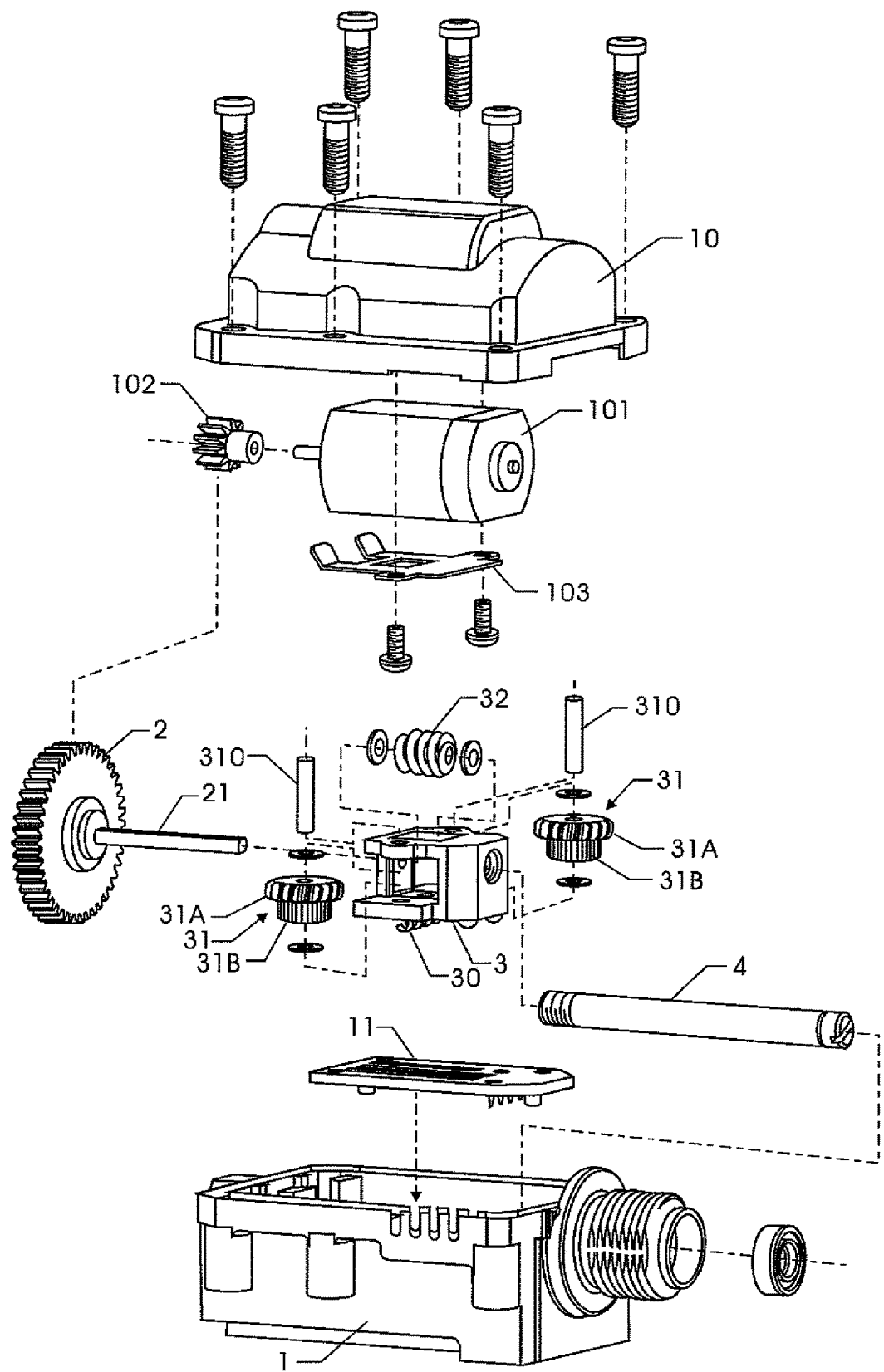
FIG. 1 is an assembled schematic view of the present invention
Figure 2:
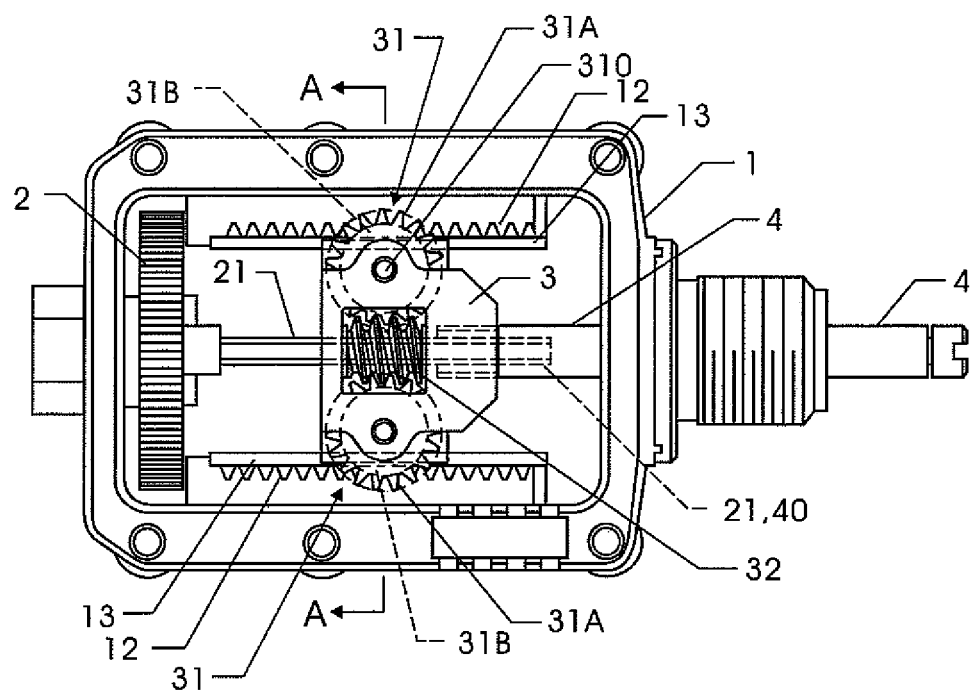
FIG. 2 is an elevational view showing an assembled base seat according to the present invention.
Figure 3:
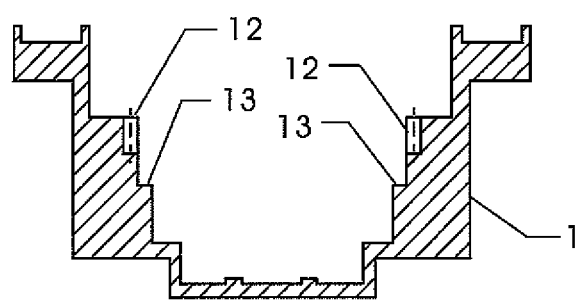
FIG. 3 is a cross sectional view along line A-A of FIG. 2.
Figure 4:
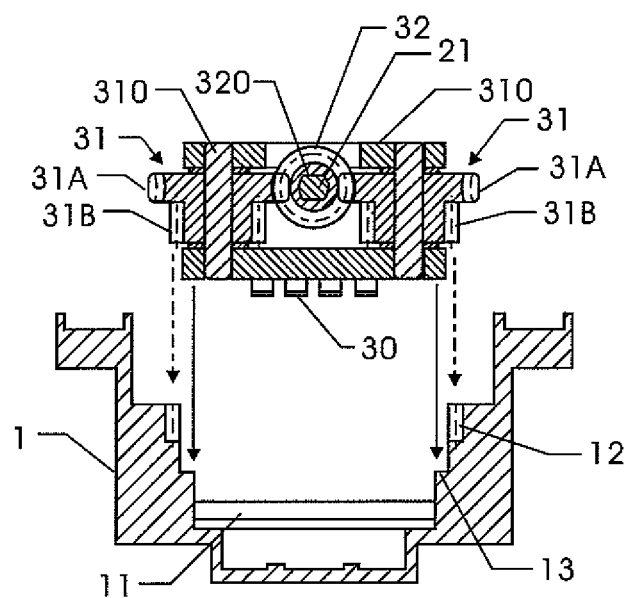
FIG. 4 is an assembled assembly view showing the base seat and moving table along line A-A of FIG. 2.
Figure 5:
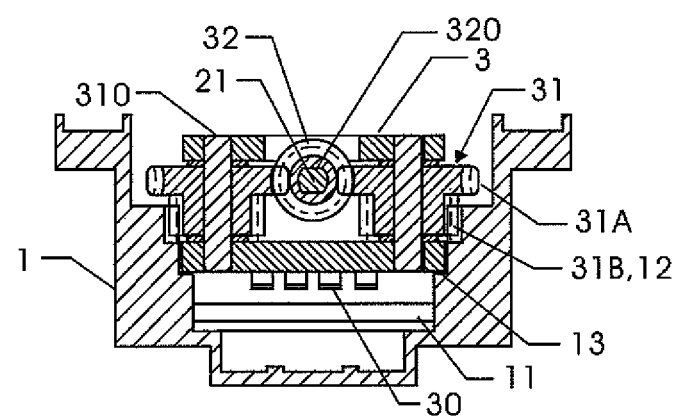
FIG. 5 is a cross sectional view along line A-A of FIG. 2.

With reference to FIGS. 1 and 2, the embodiment of the present invention is illustrated. The present invention includes the following elements.

A base seat 1 has a concave recess at an upper side thereof;

An upper cover 10 has a hollow cavity at a lower side thereof. The upper cover 10 is installed at an upper side of the base seat 1. As the upper cover 10 covers on the upper side of the base seat 1, they are formed as a box body.

A circuit assembly 11 is installed on an inner bottom of the recess of the base seat 1.

A push rod gear 2 is installed at a left wall of the recess of the base seat 1. The push rod gear 2 is extended with a long rod 21.

The motor 101 is installed within the upper cover 10. The motor 101 is installed with a motor gear 102 for engaging with the push rod gear 2 so that the motor 101 can drive the push rod gear 2. The motor 101 is installed with a motor fixing sheet 103 for assembling the motor 101 within the upper cover 10.

A movable table 3 driven by the long rod 21 and capable of moving linearly.

A push rod 4 is installed at a front end of the moving table 3 and extends out of the moving table 3.

Two sliding tracks 13 are installed in two lateral walls of base seat 1. Each of the sliding track 13 is installed with a teeth strip 12. Two sides of the movable table 3 are installed with respective moving gears 31 for engaging with the teeth strips 12 so that the moving table 3 is movable thereon. Thereby, the moving table 3 is movable along the two sliding tracks 13.

A bottom side of the moving table 3 is protruded with a plurality of finger pieces 30 which is connected to a circuit assembly 11 so that the moving table 3 is controlled to be positioned at a plurality of predetermined points.

In the present invention, two sides of the movable table 3 are installed with respective moving gears 31. A worm rod 32 is engagable with the two moving gears 31. Each moving gears 31 may be single layer gears or two layered gears. In the present invention, a two layered gears structure is used for description, but this is used to confine the scope of the present invention.

With reference to FIGS. 1 to 2, and 4 to 5, the worm rod 32 of the moving table 3 is driven by the long rod 21 extending from the push rod gear 2. The worm rod 32 is formed with an axial hole 320 which receives the long rod 21 of the push rod gear 2. A cross section of the axial hole 320 is not round. The linear moving gear 31 at two sides of the moving table 3 includes an upper worm gear 31A and a lower worm gear 31B. A positioning shaft 310 serves to fix the upper worm gear 31A and the lower worm gear 31B. Two sides of the worm rod 32 are engaged with upper worm gears 31A. The lower worm gears 31A are engaged to the teeth strips 12 at the inner wall of the base seat 1. When the long rod 21 is driven by the push rod gear 2 to rotate, the worm rod 32 will drive the moving table to move linearly.

Referring to FIGS. 1 to 2 and 4 to 5, the long rod 21 is a long rod and a cross section thereof is not round. A push rod 4 is installed at a front end of the moving table 3 and is extended out of the box body of the electric control box. A rear end of the push rod 4 is formed with a channel 40 for receiving the long rod 21. The channel 40 has a predetermined depth and an inner diameter thereof is larger than a maximum outer diameter of the long rod 21. When the moving table 3 is driven by the long rod 21 of the push rod gear 2 and thus rotates so that the moving table 3 moves linearly, the push rod 4 also move linearly and synchronously.

Figure 6:
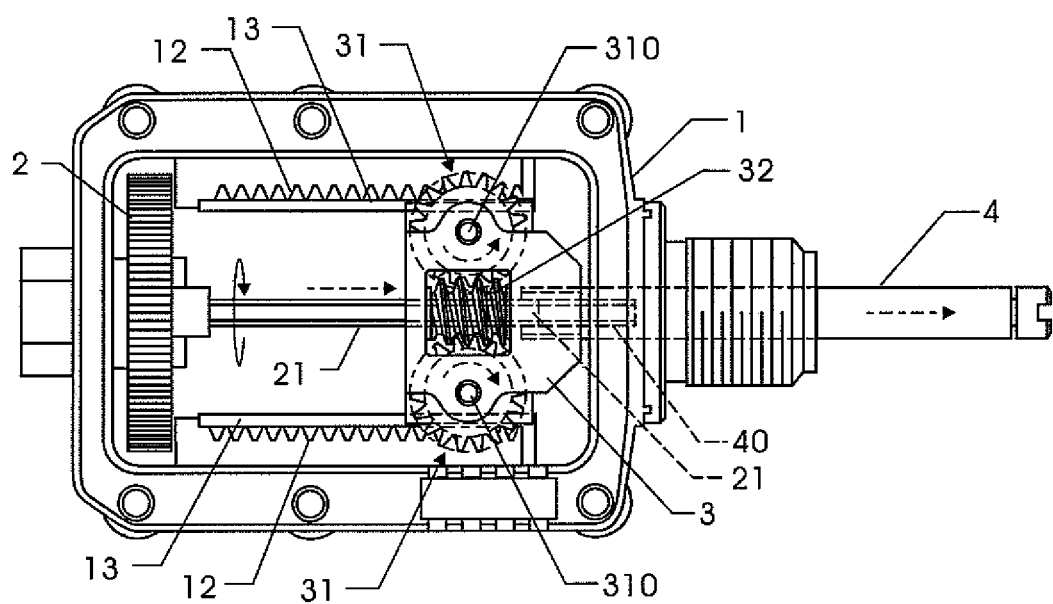
FIG. 6 is a schematic view showing the linear movement of FIG. 2.

Referring to FIG. 6, it is illustrated that the moving table 3 is driven by the long rod 21 of the push rod gear 2 due to the power from the motor gear 201, the moving table 3 will linearly move precisely due to the worm rod 32 and the linear moving gear 31 moving along the teeth strips 12 and the tracks 13. Furthermore this liner moving will cause the push rod 4 to move linearly, precisely and steadily.

Advantages of the present invention are that: the volume is small and the ratio of destroy is low. The space is used effectively so that the moving path for pushing and pull is long and thus a large pushing force or pulling force may be generated easily. Furthermore, the moving table can move and position in multiple points due to the engagements of the worm rod with the teeth strips. The moving of the moving table is steady and precise. Moreover, the present invention is a product which can be used industrially and economically.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric control box for control of linear movement, comprising:
   a base seat having a concave recess at an upper side thereof;
   an upper cover having a hollow cavity at a lower side thereof; the upper cover being installed at the upper side of the base seat; as the upper cover on the upper side of the base seat, they are formed as a box body;
   a push rod gear being installed at a left wall of the recess of the base seat; the push rod gear being extended with a long rod;
   a motor being installed within the upper cover; the motor being installed with a motor gear for engaging with the push rod gear so that the motor can drive the push rod gear; the motor being installed with a motor fixing sheet for assembling the motor within the upper cover;
   a movable table driven by the long rod and capable of moving linearly;
   a push rod being installed at a front end of the moving table and extending out of the moving table; and
   two sliding tracks being installed in two lateral walls of base seat; each of the sliding tracks being installed with a teeth strip; two sides of the movable table being installed with respective moving gears for engaging with the teeth strips so that the moving table is movable thereon; and thereby, the moving table is movable along the two sliding tracks; and
   wherein the push rod is extended out of the box body of the electric control box; a rear end of the push rod is formed with a channel for receiving the long rod; and the channel has a predetermined depth and an inner diameter thereof is larger than a maximum outer diameter of the long rod.

2. The electric control box for control of linear movement as claimed in claim 1, wherein a worm rod is engagable with the two moving gears.

3. The electric control box for control of linear movement as claimed in claim 2, wherein each moving gear is a single layer gear or two layered gears.

4. The electric control box for control of linear movement as claimed in claim 2, wherein the worm rod of the moving table is driven by the long rod extending from the push rod gear; the worm rod is formed with an axial hole which receives the long rod of the push rod gear; and a cross section of the axial hole is not round.

5. The electric control box for control of linear movement as claimed in claim 2, wherein the moving gears at the two sides of the moving table each include an upper worm gear and a lower worm gear; a positioning shaft serves to fix each upper worm gear and lower worm gear; two sides of the worm rod are engaged with the upper worm gears; the lower worm gears are engaged with the teeth strips at the inner wall of the base seat; when the long rod is driven by the push rod gear to rotate, the worm rod will drive the moving table to move linearly.

6. The electric control box for control of linear movement as claimed in claim 1, wherein a cross section of the long rod is not round.

* * * * *